United States Patent [19]

Cahill et al.

[11] Patent Number: 4,915,547

[45] Date of Patent: Apr. 10, 1990

[54] ARTICLE TRANSPORT SYSTEM

[75] Inventors: Michael J. Cahill; Kenvin R. Fincham, both of Coventry, England

[73] Assignee: Molins PLC, Milton Keynes, United Kingdom

[21] Appl. No.: 160,020

[22] Filed: Feb. 24, 1988

[30] Foreign Application Priority Data

Feb. 27, 1987 [GB] United Kingdom ............... 8704719
Mar. 17, 1987 [GB] United Kingdom ............... 8706320

[51] Int. Cl.⁴ ............... B65G 47/24; B65G 51/00; B65G 51/02; B65G 51/03

[52] U.S. Cl. ............... 406/87; 406/94; 406/70; 406/52; 406/82; 406/109; 406/86; 406/88; 406/72; 406/34; 406/76; 406/191; 406/194; 406/195; 406/108; 193/46; 198/374; 198/417

[58] Field of Search ............... 406/86-89, 406/93-95, 52, 70, 72, 76, 81, 82, 34, 36, 109, 191, 194, 195, 108; 414/129, 131; 198/374, 417; 193/46; 271/119, 109, 131, 139, 140, 310, 184, 185, 195, 69, 258, 262, 259, 261

[56] References Cited

U.S. PATENT DOCUMENTS

| 845,415 | 2/1907 | Hicks | 193/46 X |
|---|---|---|---|
| 1,053,634 | 2/1913 | Nagy | 193/46 X |
| 1,446,591 | 2/1923 | Small | 193/46 X |
| 2,141,460 | 12/1938 | Brown et al. | 198/374 X |
| 3,129,978 | 4/1964 | Szatkowski | 406/94 |
| 3,253,694 | 5/1966 | Kinney | 198/374 |
| 3,411,829 | 11/1968 | Albright | 271/195 X |
| 3,474,891 | 10/1969 | Kamila | 198/390 X |
| 3,684,327 | 8/1972 | Hurd | 406/88 X |
| 3,747,922 | 7/1973 | Groeber | 406/88 X |
| 3,776,404 | 12/1973 | Anastasio et al. | 198/374 X |
| 4,557,638 | 12/1985 | O'Neill | . |
| 4,578,002 | 3/1986 | Taneda | . |

FOREIGN PATENT DOCUMENTS

| 1200392 | 12/1959 | France | 406/82 |
|---|---|---|---|
| 2063220 | 6/1981 | United Kingdom | . |
| 2133371 | 7/1984 | United Kingdom | . |
| 2163118 | 2/1986 | United Kingdom | . |
| 2185954 | 8/1987 | United Kingdom | . |

Primary Examiner—Sherman D. Basinger
Assistant Examiner—James M. Kannofsky
Attorney, Agent, or Firm—Antonelli, Terry & Wands

[57] ABSTRACT

A transport system particularly for flat articles, e.g. cards, includes guides which allow alternate articles to be conveyed in different orientations through the same duct (122) so that the risk of jamming or shingling during conveyance is eliminated. In a preferred arrangement the system includes a crossed-axes pneumatic duct (122) and driven rollers (144) for introducing cards (12) into the duct in different orientations. The system also includes intermediate air supply stations (138), a card inspection unit (134), and a receiving station (139) including a device (145) for turning cards so that they are all received in the same orientation.

25 Claims, 11 Drawing Sheets

ARTICLE TRANSPORT SYSTEM

This invention relates to an article transport system, particularly but not exclusively for pneumatically conveying articles between relatively remote locations in a manufacturing process. One use for the invention is in supplying cards to a cigarette packing machine where the cards are used as inserts in cigarette packets.

According to one aspect the invention comprises an article transport system comprising means defining a path along which articles are conveyed, said path defining means including means for maintaining articles in at least two different orientations as they are conveyed along said path. The system may be used particularly for supplying articles having a major axis (such as cards), in which the articles may be conveyed along a substantially common path in at least two different orientations of said axis. For example, a pneumatic duct may comprise guide means defining first and second orientations for pieces of card, whereby risk of jamming of successive cards may be avoided by ensuring that successive cards are conveyed in different orientations. The duct may comprise a common chamber shaped so as to retain articles in the orientation in which they are introduced into it.

The conveyance of articles in different orientations may have other advantages: for example even where the articles are not relatively flat such as cards the articles may have parts which could interlock or become damaged by contact if successive articles had the same orientation. Selection of particular different orientations may avoid these problems. Additionally it may be advantageous to convey articles in different orientations to facilitate separation or diversion of articles at a downstream end of said path by allowing different handling of differently orientated articles at said downstream end.

In a preferred arrangement the system includes means for introducing articles into a duct in different orientations. Where the articles are flat, such as cards, said means may comprise a pair of driven rollers having angled faces and axially movable in relation to each other so that they may convey cards in at least two different orientations.

In addition to article conveying chambers a duct of the present invention may include further chambers for conveying pressure air, and may include one or more connections between a pressure air chamber and a conveying chamber for passage of air for aiding conveyance of articles.

According to another aspect of the invention an article transport system comprises a pneumatic conveying duct in which articles may be conveyed in at least two different orientations, means for introducing articles into the duct in different orientations, and means for introducing conveying air into the duct at intermediate stations through which articles are conveyed while retaining their respective orientations. The system may further include inspection means in which damaged articles are detected. For example, where the articles are flat pieces of card, a deviation in the shape of the cards such as may be caused by delamination may be detected by detecting a change in air flow over or adjacent the surface of the card or by interrupting or scattering light or other radiation passing close to the surface of the card to an optical or similar sensor.

According to a further aspect of the invention an article transport system, particularly for supplying cards in line from a supply, comprises a pneumatic conveying duct in which a first stream of air is directed for conveyance of articles along the duct and a second stream of air is directed for creating an air bearing to facilitate the movement of the articles through the duct. For this purpose, at least part of the duct may comprise separate chambers respectively to and from which the first and second air streams are supplied. The duct may comprise a longitudinal partition having perforations or apertures to allow passage of air to create an air bearing for the cards. Articles may be supplied in line through a duct by pneumatic means from a remote supply station to one or more processing machines. The supply station may include means for stacking articles and means for withdrawing articles in line from the stack. A receiving station at a processing machine may comprise means for reforming a stack from articles received pneumatically. The invention will be further described, by way of example only, with reference to the accompanying diagrammatic drawings, in which:

FIG. 1 shows a sending station 10 of a card transport system. Cards 12 are supplied to the upper end of a hopper 14 to form a stack. A wheel 16 having stepped portions 18 is rotatable beneath the hopper 14 so that successive lowermost cards 12 in the hopper 14 are engaged by a stepped portion 18 and projected towards an entry aperture 20 of conveying duct 22. After each card 12 has been engaged by a stepped portion 18 of the wheel 16 the next card in the hopper 14 is supported in the hopper by the curved periphery of the wheel 16 until it too is engaged by the next stepped portion 18.

Figure 1:
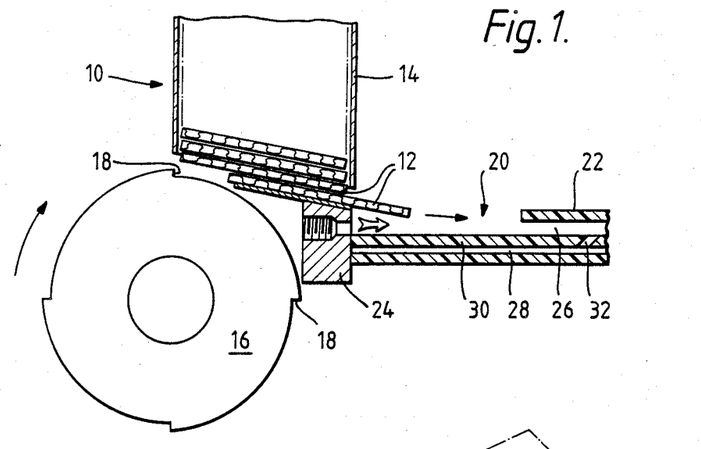
FIG. 1 is a side view of a sending station of a card transport system.
Figures 3, 4, 5:
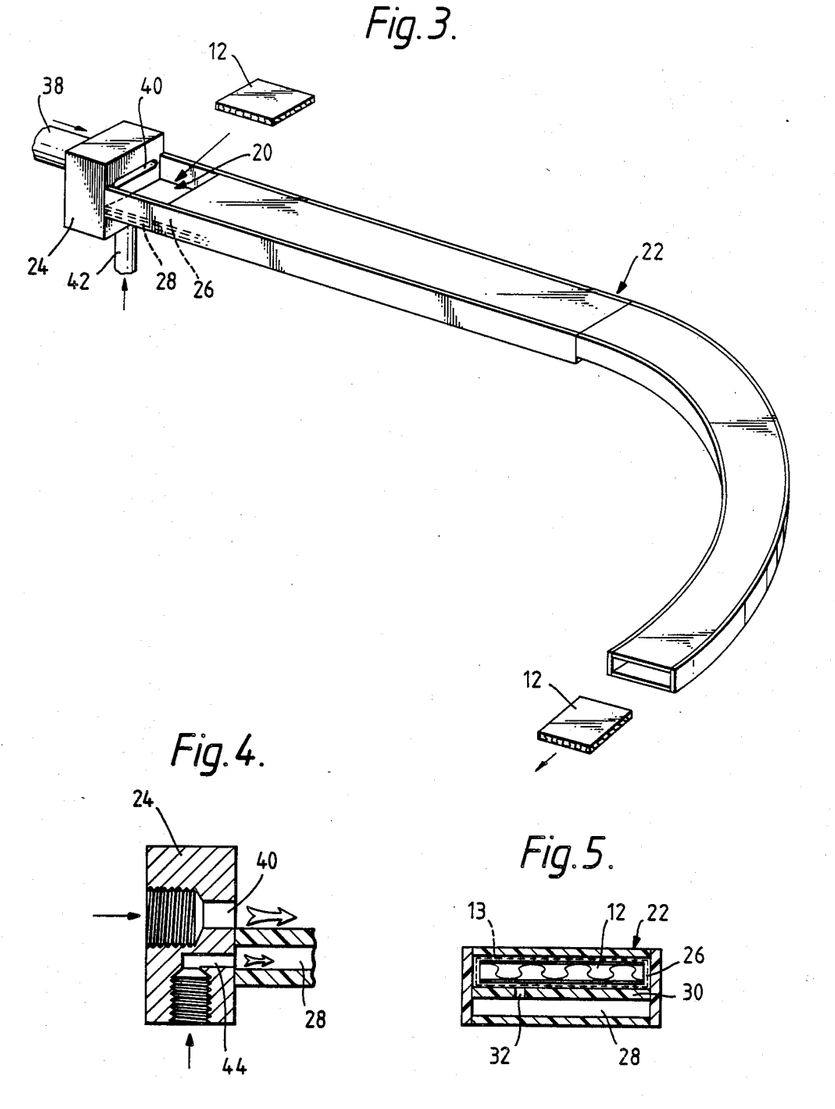
FIG. 3 is a further perspective view of part of a card transport system showing an air supply unit.
FIG. 4 is a longitudinal sectional view of the air supply unit of FIG. 3.
FIG. 5 is a transverse sectional view of a duct of the card transport system of FIG. 3.

A manifold 24 (shown in greater detail in FIGS. 3 and 4) supplies air under pressure to the duct 22 to convey cards 12 along it. The duct 22 has an upper chamber 26, along which the cards 12 are conveyed, and a lower chamber 28, to which air is supplied to provide an air bearing for the cards in the upper chamber 26. For this purpose a dividing partition 30 between the upper and lower chambers 26, 28 is provided with apertures 32 (FIGS. 1 and 5). Air passing through the apertures 32 from the lower chamber 28 "fluidizes" or "lubricates" the passage of the cards 12 through the upper chamber 26 of the duct 22. The apertures 32 may be angled so that air passing from the lower chamber 28 to the upper chamber 26 has a component in the direction of conveyance of the cards 12.

Figure 2:
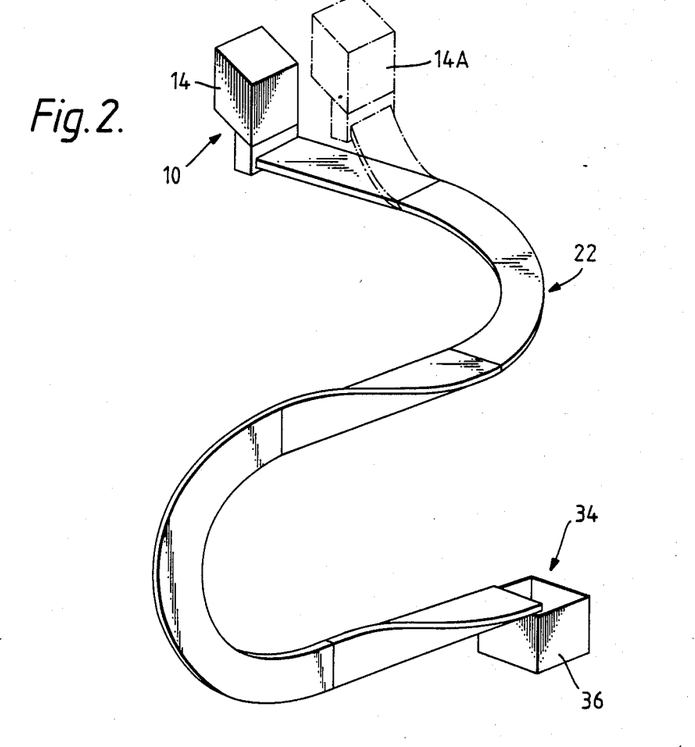
FIG. 2 is a perspective view of a card transport system.
Figure 6:
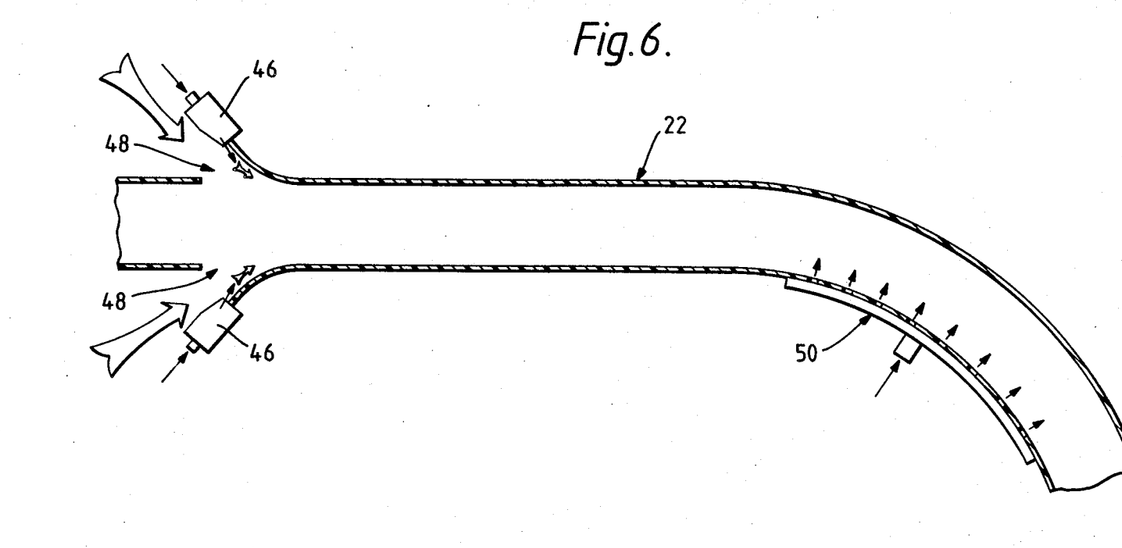
FIG. 6 is a longitudinal sectional view of part of a card transport system showing a different air supply unit.
Figure 7:
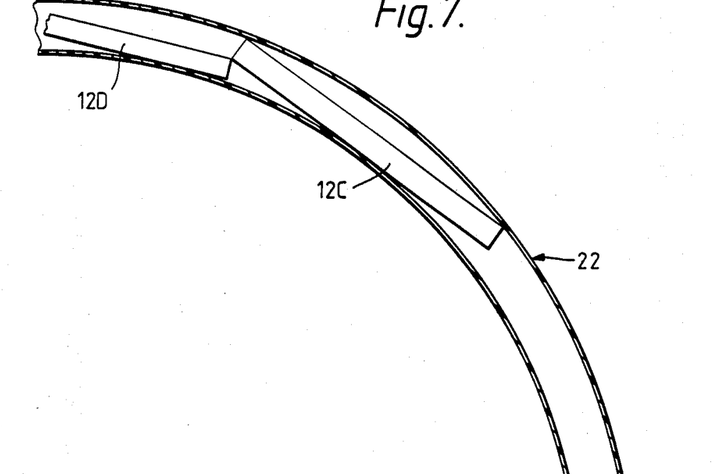
FIGS. 7 and 8 are views showing passage of cards around bends in a card transport system.

FIG. 2 shows a duct 22 extending between a sending station 10 and a receiving station 34. The duct 22 has curves in the plane of conveyance of the cards and also includes twisted portions. The duct 22 could also have curves about axes parallel to the transverse axis of the cards (as shown in FIGS. 6 and 7). The receiving station 34 comprises a hopper 36 in which cards are reformed into a stack. This may be achieved by decelerating the cards in a controlled manner and then deflecting them downwards using air jets to reform a stack in the hopper 36. The receiving station 34 may be substantially similar to the receiving station in the pneumatic conveying system designed for rod-like articles described and illustrated in British patent specification No. 1561560, with a difference being that after deflection the cards are received in a stack from the bottom end of which a single row stream is subsequently removed (possibly using a wheel similar to the wheel 16).

FIGS. 3-5 illustrate an arrangement for supplying a duct 22 with air. A fan or compressor (not shown) supplies air through a pipe 38 to a passageway 40 through which conveying air is directed into the upper chamber 26. Another fan or compressor supplies air through a pipe 42 to a passage 44 in the manifold 24 and this supplies the lower chamber 28 with air under pressure for the air bearing. Note that in FIG. 3 the duct 22 comprises upper and lower chambers 26, 28 for only a relatively short section adjacent the manifold 24. Downstream of this section the duct 22 comprises only the upper conveying chamber 26 and the partition 30 becomes the lower wall of the duct; in practice it may be necessary to extend the section in which upper and lower chambers 26, 28 are provided (so that the section may extend for a substantial part of or even the whole length of the duct) or possibly to reduce its length (so that in some circumstances it may even be unnecessary to provide any lower chamber 28).

FIG. 6 shows an alternative arrangement for supplying conveying air to the duct 22. In this arrangement air injectors 46 using relatively small quantities of compressed air are used to entrain relatively large quantities of ambient air through adjacent apertures 48 in the side walls of the duct 22. Note that an air bearing 50 is provided in the region of a bend in this arrangement.

At the sending station 24 air may be supplied using either the arrangement of FIGS. 3-5 or that of FIG. 6. Where the length of the duct 22 is relatively long (e.g. up to 10 metres or more) it may be necessary to boost the conveying air downstream of the sending station 24 (i.e. to provide intermediate air supply stations in the duct); in this case it is convenient to use the arrangement of FIG. 6 for the intermediate stations.

Figure 8:
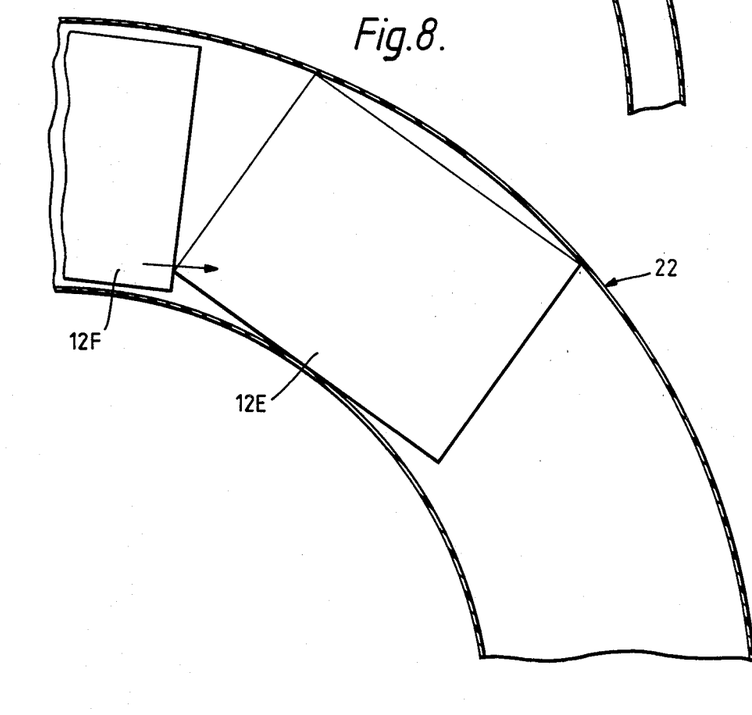

FIGS. 7 and 8 show the considerations necessary in order to successfully convey cards through duct portions which curve in different planes. Referring to FIG. 7, the depth and radius of the duct 22 should be such that a trailing card 12D cannot become wedged between the duct wall and a leading card 12C. In FIG. 8 the width and radius of the duct 22 should be such that a trailing card 12F should not be capable of locking a leading card 12E in the curve of the duct.

One form of card which is required to be inserted into a cigarette packet at a cigarette packing machine and for which the current transport system may be used comprises a piece of corrugated card having dimensions 70×52×4mm. A typical rate of supply and usage is 200 per minute.

In the illustrated card transport systems conveyance through the duct is mainly by friction of air moving past the card surfaces, so that the conveying air velocity is somewhat higher than that required for the velocity of the cards. Particularly where the cards have a cross-sectional area which is a substantial proportion of the cross-sectional area of the duct, there is also some movement solely due to pressure of the conveying air on the ends of the cards.

One possible modification of the current arrangement is to insert mobile pusher members in the ducts, these having a cross-sectional area substantially similar to that of the duct (and being indicated at 13 in FIG. 5), so that the pusher member travels through the duct rather like a piston in a cylinder. Cards and pusher members may be inserted in the duct alternately. In this case each pusher member will then push through the duct the card which is immediately ahead of it in the duct. Feed means for inserting pusher members between cards in the duct at or adjacent to the sending station (and indicated at 14A in FIG. 2) and separating means at the receiving station to extract pusher members before the cards are further processed may also be provided.

Where the sending station is located at an upstream processing machine and the receiving station is located at a downstream processing machine, a buffer reservoir between the upstream and downstream machines is provided by having a stack of cards at the receiving station. However, it would also be possible to arrange for the receiving station to feed cards directly to the downstream processing machine (e.g. a cigarette packing machine) from the duct.

It is contemplated that if the sending station is at a level above that of the receiving station, or if portions of the duct are otherwise inclined downwardly, conveying air may be reduced or even eliminated and provision of an air bearing (as in the first section of the duct 22 in FIG. 3) may fluidize the cards sufficiently so that they pass through the duct under the action of gravity at the required rate.

In general the flow of cards through the duct should be such that the card/space ratio remains reasonably constant, and at least so that cards do not normally catch up with each other. In spite of this precautions should be taken (as indicated in FIGS. 7 and 8) to ensure that if cards do come into contact with each other they will not jam in the duct. With respect to FIG. 7 it will be seen that one preferred parameter to avoid this is that the thickness of the card should be greater than half the depth of the duct. Another preferred parameter to avoid jamming or excessive deceleration due to friction is bend radius: where the bend is in the plane of the cards a radius of about 1m has been successfully used in a 90° bend with cards of the size mentioned above and a duct section of 55×6mm.

Figure 9:
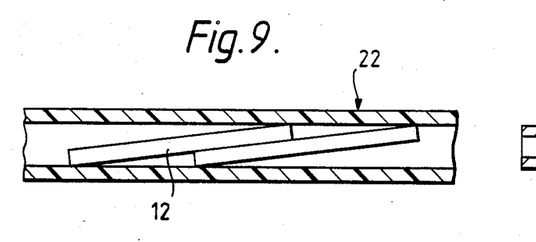
FIG. 9 is a longitudinal sectional view of part of a duct.
Figure 10:
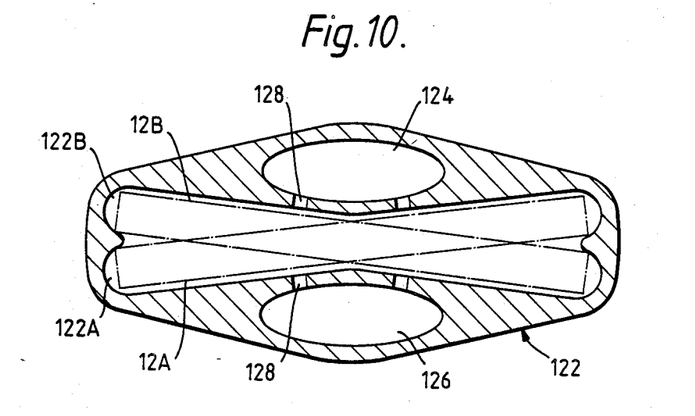
FIG. 10 is a transverse sectional view of a modified duct.

FIG. 9 shows how thin cards 12 may become jammed by "shingling" in a duct 22. One way of avoiding this is to use a modified duct 122 as shown in FIG. 10. The duct 122 comprises a conveying channel which may be regarded as comprising two crossed axes conveying channels 122A, 122B into which alternate cards 12A, 12B are delivered. The duct 122 further includes longitudinal chambers 124, 126, into which high pressure air may be supplied, so that the duct 122 may be used to convey such air to parts of the system at which it is required. Passages 128 may extend from the chambers 124, 126 to allow air to pass into the channels 122A, 122B. Air passing from the chamber 124 or 126 into the channels 122A, 122B may provide an air bearing for the cards and may also provide some conveying action. It would be possible for the chambers 124, 126 to receive air from the channels 122A, 122B, for example where it is required to exhaust conveying air at or near the end of the duct 122.

By conveying successive cards in different channels 122A, 122B the risk of jamming through shingling is totally eliminated. It may be preferable to arrange that the angle between the two channel sections 122A, 122B is fairly shallow (as shown in FIG. 10) so that the area of contact when cards are in abutment is relatively large (to minimize any possibility of damage to the cards by impact with each other).

The duct 122 may be manufactured from extruded aluminium or plastics material (which is preferably impregnated to make it conductive to minimize electrostatic problems).

Figure 11:
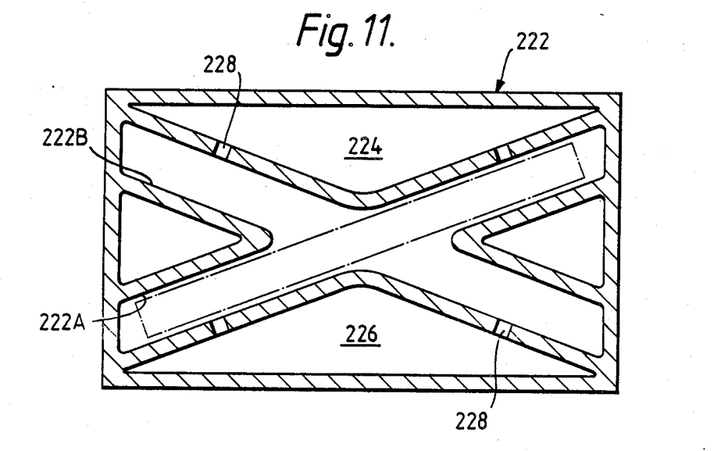
FIG. 11 is a transverse sectional view of another modified duct.

An alternative duct 222 is shown in FIG. 11. The duct 222 is similar in operation to duct 122 and contains conveying channels 222A and 222B, chambers 224 and 226, and passage 228. The duct 122 or 222 may replace the duct 22 in the system of FIGS. 1-8.

Factors affecting the choice of cross-sectional shape of a duct are ability to provide adequate flow to convey the cards, economy in use of air, card stability during conveyance with little or no tendency to block or cause damage to the cards, ease of manufacture of the duct, compatibility with the air supply system and an ability to readily accommodate changes in direction.

Figure 12:
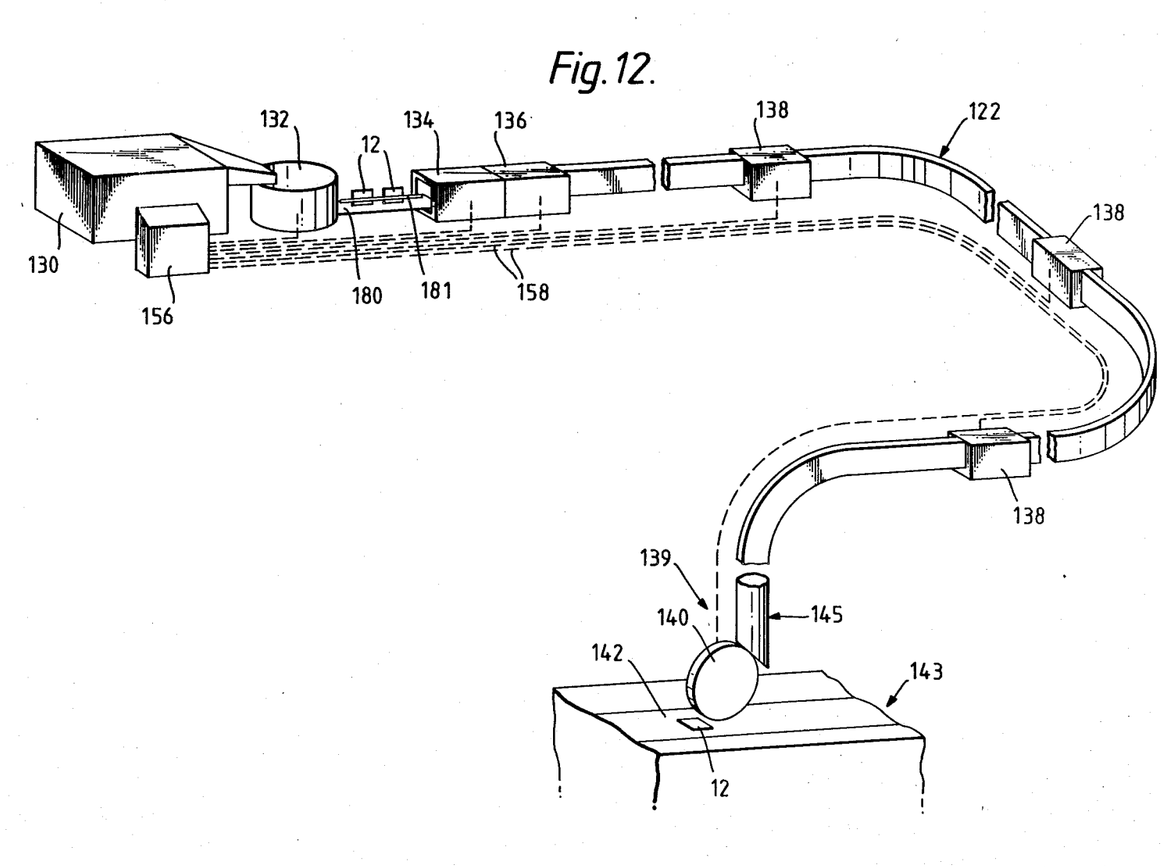
FIG. 12 is a perspective view of a modified card transport system.

FIG. 12 shows a modified card transport system incorporating the duct 122. Cards 12 are supplied to a hopper 130, from where they pass into a known bowl sorter 132 in which they are orientated by centrifugal action for supply upright (between guides) to an inspection unit 134. After inspection acceptable cards are fed to a drive and orientation unit 136 which feeds them into the duct 122. The duct 122, which may be up to 100 metres or more in length, is provided with intermediate air supply boost stations 138. At the downstream end of the duct 122 successive cards are received at a receiving station 139 by a rotating drum 140 and passed by way of a conveyor 142 into a position on which they receive a bundle of cigarettes in an extended bed of a cigarette packing machine 143 where the bundles and cards are assembled into cigarette packets.

Figure 13:
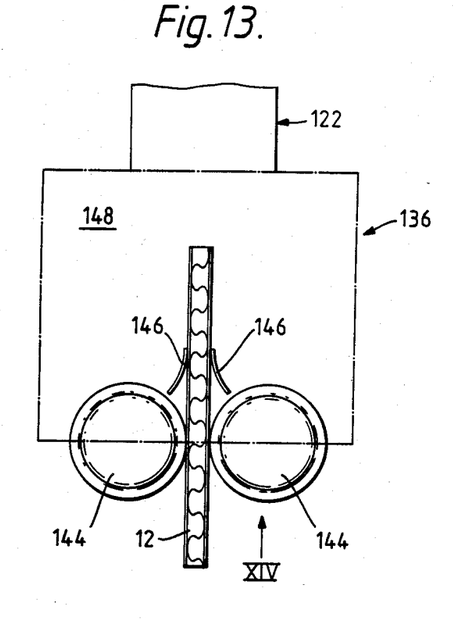
FIG. 13 is a top view of a drive and orientation unit of the system of FIG. 12.
Figure 14:
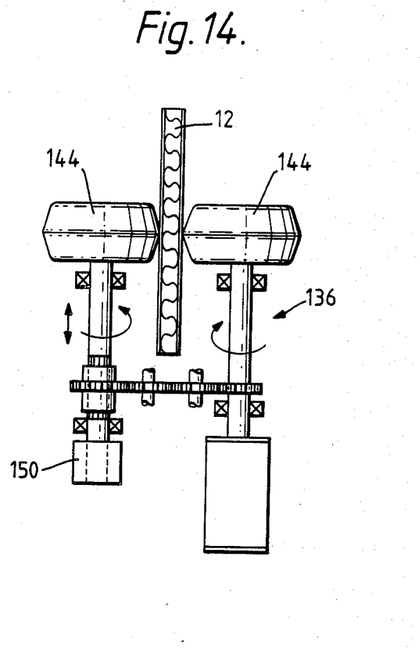
FIG. 14 is a view of the unit of FIG. 13 in the direction of arrow XIV.
Figure 15:
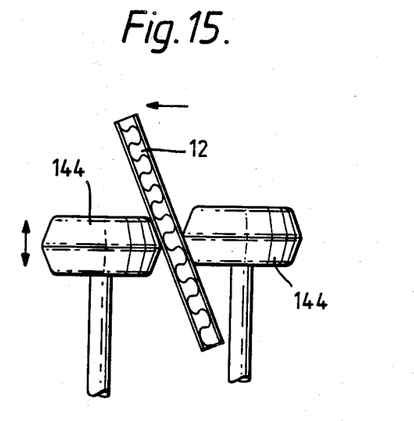
FIGS. 15 and 16 show operation of the unit of FIG. 13 to change orientation of a card.
Figure 16:
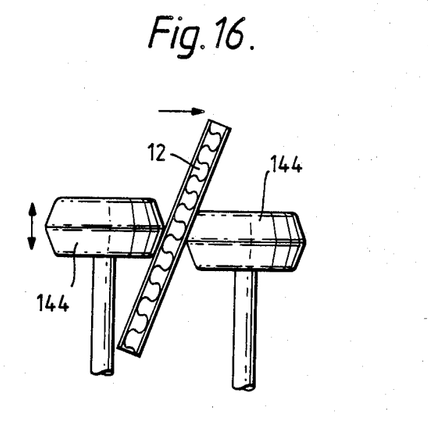

FIGS. 13 and 14 show the drive and orientation unit 136. This comprises a pair of driven rubber wheels 144 between which cards 12 are driven past reed flaps 146 into a pressurized chamber 148 from which air flow carries them into the duct 122. One of the drive wheels 144 is reciprocable longitudinally by action of a solenoid 150 (or other suitable means). At the time when the leading end of each card enters its respective channel of the duct 122 its orientation is aligned with that of the channel. This is shown in FIGS. 15 and 16.

Figure 17:
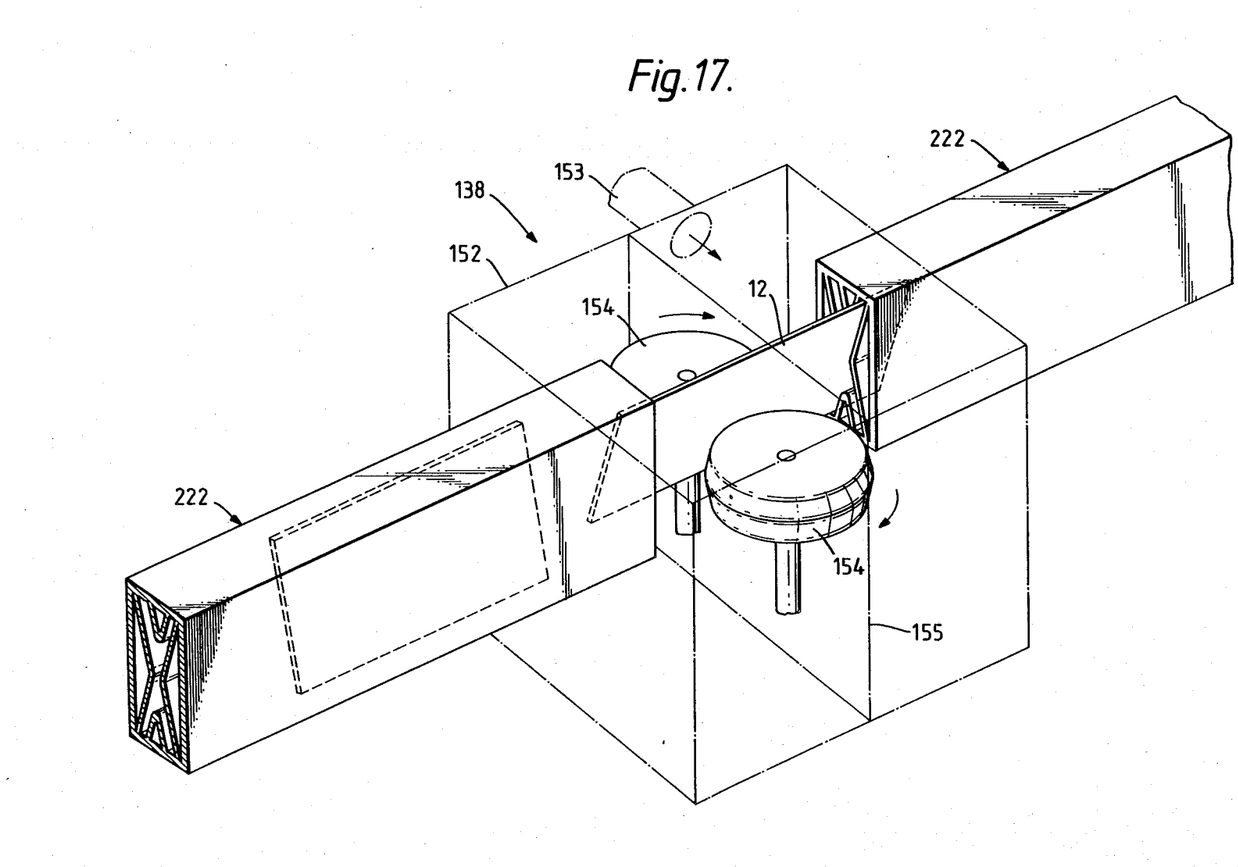
FIG. 17 shows an air pressure booster unit of the system of FIG. 12.

As shown in FIG. 17, the duct booster units 138 each comprise an air pressure chamber 152 into which extend upstream and downstream sections of the duct 222 (or 122). In the chamber 152 additional air under pressure is supplied to the downstream duct 222 through pipe 153 and a pair of driven rubber rollers 154 is used to convey cards 12 through the chamber 152 between the ducts 222. The ends of the ducts 222 are separated by less than the length of a card 12, so that orientation of the cards is retained as they pass through the station 138. Therefore, unlike the rollers 144 in the unit 136, the rollers 154 need have no axial movement. The chamber 152 may preferably be sub-divided by an internal sealing partition 155 into a downstream low-pressure region and an upstream high pressure region. The rollers 154 propel the cards 12 through sealing apertures (e.g. incorporating resilient flaps) in the partition 155. This arrangement prevents or reduces back-pressure in the upstream part of the duct 222.

The system of FIG. 12 has an optoelectronic control system 156 including control lines 158. One feature of this is that cards will be counted into each of the sections, e.g. at the entrance to the unit 136 and each of the units 138 and just upstream of the drum 140, and their passage through the system monitored. In this way a blockage may be quickly identified and an operator alerted to the location of the blockage. In addition the system 156 uses information on passage of cards to govern the rollers 154 at intermediate stations 138 to regulate the flow of cards.

Figure 18:
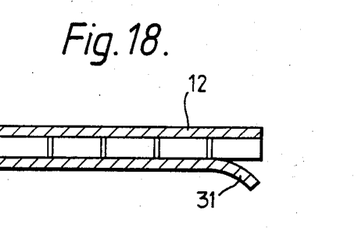
FIG. 18 shows a damaged card.
Figure 19:
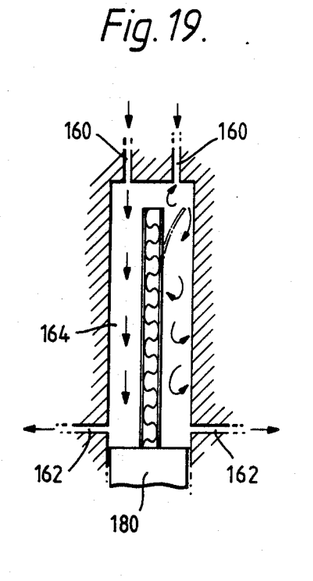
FIGS. 19-21 show different card inspection units for the system of FIG. 12.
Figure 20:
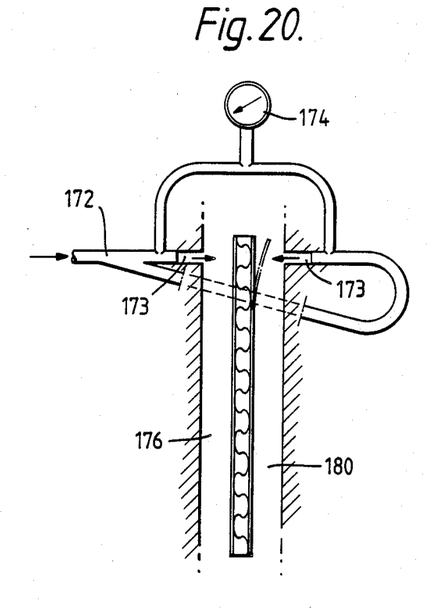
Figure 21:
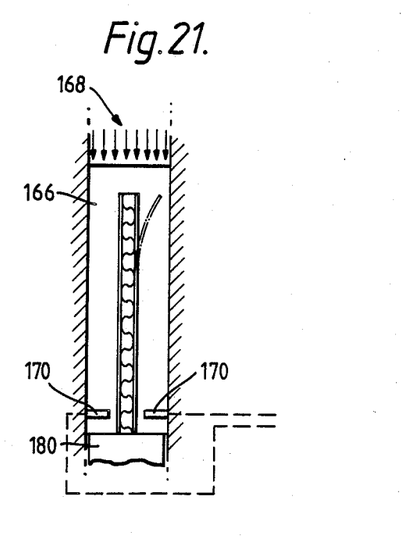

The inspection unit 134 is principally used to identify cards 12 having damage in the form of a delamination 31 as shown in FIG. 18. The unit 134 could take various forms. One form, as shown in FIG. 19, identifies a damaged card by detecting alteration in air flow across the surface of the card and comprises a chamber 164 for receiving a card and having air flow inlet passages 160 and exit passages 162. Another form of unit 134, shown in FIG. 20, detects alteration in back pressure in air supply to a chamber 176 containing the card and having opposed air inlet passages 173 linked to a common supply 172 and to a gauge 174 for measuring pressure difference (i.e. flow). Alternatively, as shown in FIG. 21, the unit 134 may comprise an infra-red (or optical) method of detection with a chamber 166 across which beams from an array 168 of infra-red sources are directed towards detectors 170. In all cases the unit 134 generates a signal if a damaged card is detected, and this may be used for automatic or manual rejection of that card. The various forms of unit 134 may be used in combination in a single unit. A card conveyor 180 (see also FIG. 12) for transporting cards to (and from) the unit 134 may be provided, as may means (e.g. guides as indicated at 181 in FIG. 12) for maintaining orientation and position of the cards in the unit.

Figure 22:
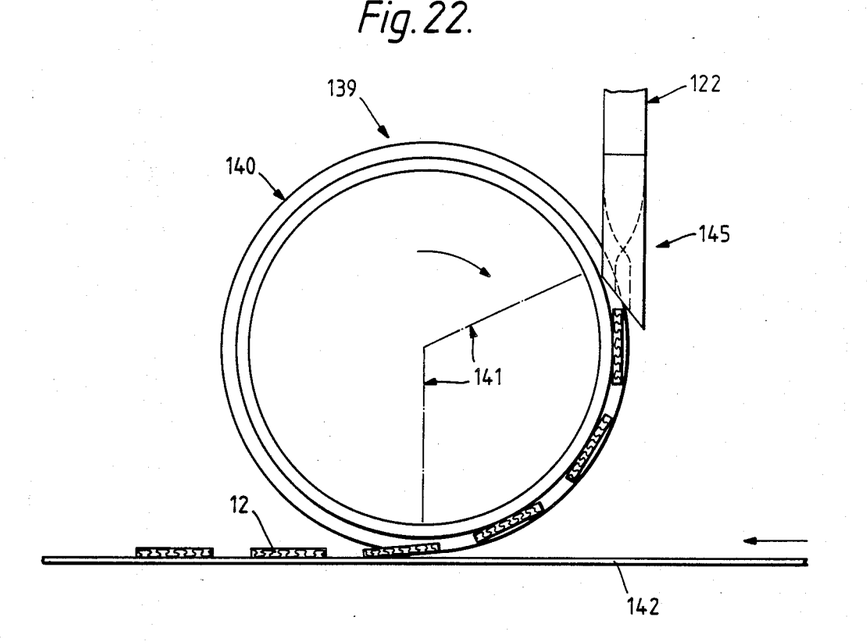
FIG. 22 shows in more detail a receiving station of the system of FIG. 12.

As shown in FIG. 22, the receiving station 139 comprises a suction drum 140 having suction applied in a sector 141 for transfer of successive cards 12 from a reorientating tube 145, arranged at the end of the duct 122, onto the conveyor 142. The reorientating tube 45, shown in greater detail in FIG. 23, comprises a cylindrical outer tube 146 containing front and rear partitions 148, 150 respectively which, at the upper end of the tube which adjoins the duct 122, respectively are aligned with front and rear walls 122C and 122D of duct 122. Hence the partitions 148, 150 have shallow V-shaped bends (in opposite directions) along central longitudinal lines 149, thereby preserving the orientation of cards 12 entering the tube 146 from the duct 122. The partitions 148, 150 twist spirally through 90° as they extend along the length of the tube 146 and progressively lose their central bends so that at the lower end of the tube they are generally flat and parallel. Approaching their lower ends the partitions 148, 150 may taper towards each other so that they become closer to restrict movement of cards 12. The outer cylindrical tube 146 restricts lateral movement of the cards 12.

Figure 23:
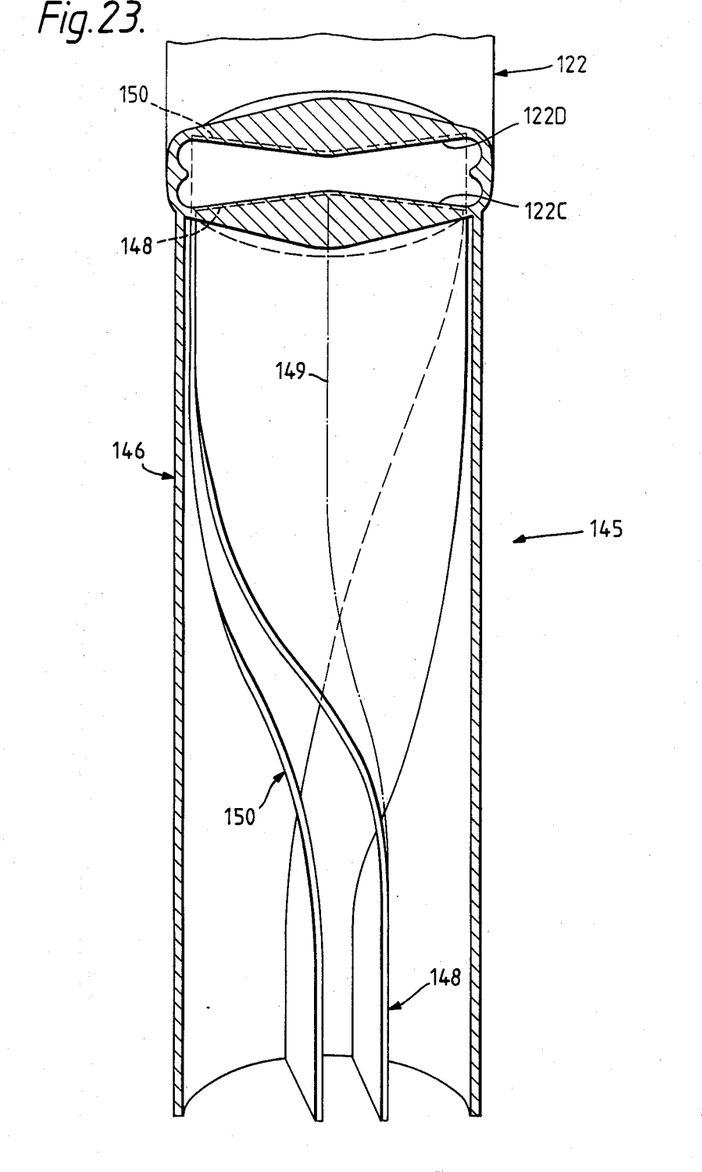
FIG. 23 is a longitudinal sectional view of part of the station of FIG. 22.

Successive cards 12 received in different orientations at the top of the tube 145 are delivered in the same orientation to the drum 140 from the bottom of the tube. Preferably the partitions 148, 150 are twisted so that during an upper part of the tube 145 cards in one orientation are progressively brought into alignment with those in the other orientation and in a lower part of the tube all cards are turned further to bring them into alignment with the exit from the tube. FIG. 23 shows partitions which turn cards in an anti-clockwise direction: clearly it would be possible to turn them in a clockwise direction by arranging the twist or spiral of the partitions in the opposite direction.

We claim:

1. An article transport system comprising a pneumatic conveying duct having means defining a path for conveying relatively flat articles in two separate orientations through the duct, said orientations differing by a relatively small imaginary relative rotation of an article about an axis extending generally parallel to said path, said path defining means being arranged such that articles introduced into the duct respectively in first or second orientations remain in the same orientation throughout the length of the duct, and means for introducing articles into the duct alternately in said first and second orientations, whereby successive articles conveyed pneumatically through said duct are unable to jam or otherwise adversely interfere with each other because of their respective different orientations.

2. A system as claimed in claim 1, wherein said introducing means comprises driven means comprising first and second conveyors between which articles are delivered to the duct, said conveyors being relatively movable in a direction transverse to the length of the duct so as to deliver successive articles in said alternately different orientations.

3. A system as claimed in claim 1, wherein said duct comprises first and second portions separated by an intermediate station, including opposed conveyors for engaging said articles at said station and for conveying articles received in said respectively different orientations while maintaining them in said orientations.

4. A system as claimed in claim 1, wherein said delivering means includes means for changing the orientation of articles before delivering them onto said path.

5. A system as claimed in claim 4, wherein said changing means is arranged to impart alternately different orientations to successive articles.

6. A system as claimed in claim 4, wherein the changing means is arranged to twist articles about an axis substantially parallel to their direction of conveyance.

7. A system as claimed in claim 1, including receiving means having means for reorientating at least some articles so that articles may be received from said path in the same orientation.

8. A system as claimed in claim 7, wherein said reorientating means includes means for twisting articles about an axis substantially parallel to their direction of conveyance.

9. A system as claimed in claim 7, wherein said receiving means further comprises a suction conveyor for transferring articles from said reorientating means to further receiving means.

10. A system as claimed in claim 1, said pneumatic duct having a first chamber defining said path and a second chamber extending in generally the same direction as said path for conveying air.

11. A system as claimed in claim 10, including spaced means allowing air flow between said first and second chambers for conveyance of articles in said first chamber.

12. A system as claimed in claim 10, including spaced means allowing air flow between said first and second chambers for providing an air bearing for assisting conveyance of articles in said first chamber.

13. A system as claimed in claim 10, including upstream and downstream portions of said duct, and an intermediate connecting means connecting said portions including means for admitting air under pressure for supply to the downstream portion.

14. A system as claimed in claim 13, wherein said intermediate connecting means includes further conveyor means for transferring articles between said portions.

15. A system as claimed in claim 14, wherein said further conveyor means comprises opposed conveyors arranged to convey and maintain articles in different orientations through said intermediate connecting means while maintaining the respective orientations of said articles.

16. A system as claimed in claim 1, including a supply station, means for delivering articles towards said path from said station, and a remote receiving station for receiving articles from said path and for conveying them towards further processing means.

17. A system as claimed in claim 16, wherein said supply station includes means for retaining a stack of articles, and said delivering means includes means for removing successive articles from a stack.

18. A system as claimed in claim 16, wherein the receiving station includes means for receiving articles on an endless conveyor.

19. An article transport system, comprising:
   means defining a path along which articles are conveyed, including means for maintaining articles in at least two different orientations as they are conveyed along said path; and
   delivering means for delivering articles onto said path in different orientations, including changing means arranged to twist articles about an axis substantially parallel to their direction of conveyance for changing the orientation of articles before delivering them onto said path;
   wherein said delivering means comprises a pair of driven rollers having angled faces adapted to convey articles between them, said changing means comprising means for causing relative axial movement of said rollers.

20. An article transport system comprising a pneumatic conveying duct in which articles may be conveyed in at least two different orientations which are angularly spaced relative to the longitudinal axis of the duct, means for introducing articles into the duct in different orientations, and means for introducing conveying air into the duct at an intermediate station through which articles are conveyed while retaining their respective orientations, said intermediate station having conveying means for receiving articles in either of said at least two orientations and for conveying articles through said intermediate station while maintaining their respective orientations.

21. A system as claimed in claim 20, further including inspection means in which damaged articles are detected.

22. An articles transport system, comprising:
means defining a path along which articles are conveyed, including a chamber having guide means defining first and second orientations which differ in angular directions about an axis extending generally parallel to said path to maintain articles in said first and second orientations as they are conveyed along said path; and
means for delivering articles onto said path in different orientations, including further guide means and means for moving said further guide means between a first position in which at least a part of said further guide means as aligned with said guide means defining said first orientation and a second position in which at least a part of said further guide means is aligned with said guide means defining said second orientation.

23. An article transport system according to claim 22, wherein said further guide means comprises opposed guide surfaces, at least one of which is reciprocated between said first and second positions.

24. An article transport system according to claim 23, wherein said opposed guide surfaces comprise a pair of driven rollers having angled faces adapted to convey articles between them, said moving means comprising means for causing relative axial movement of said rollers.

25. An article transport system, comprising:
means defining a duct along which articles are conveyed in a single row, including guide means for maintaining articles in said duct in first and second orientations, which differ by imaginary relative rotation of an articles about an axis extending generally along the path of conveyance through said duct, said guide means extending along the entire length of said duct so that articles introduced into said duct remains in the same orientation throughout the length of the duct; and
pneumatic means for effecting conveyance of articles along the length of said duct.

* * * * *